United States Patent [19]
Tamura et al.

[11] Patent Number: 6,147,701
[45] Date of Patent: Nov. 14, 2000

[54] IMAGE SENSING APPARATUS

[75] Inventors: Junichi Tamura, Kawasaki; Masakazu Fujiki, Yokohama, both of Japan

[73] Assignee: Canon Kabushiki Kaisha, Tokyo, Japan

[21] Appl. No.: 08/892,678

[22] Filed: Jul. 14, 1997

[30]       Foreign Application Priority Data

Jul. 17, 1996   [JP]   Japan ................................. 8-187392

[51] Int. Cl.⁷ .................................................... H04N 7/18
[52] U.S. Cl. .......................... 348/36; 348/143; 348/211; 348/373
[58] Field of Search ............................ 348/36, 143–159, 348/211, 373

[56]              References Cited
          U.S. PATENT DOCUMENTS

| | | | |
|---|---|---|---|
| 4,930,595 | 6/1990 | Hayward et al. ........................ | 181/104 |
| 5,335,142 | 8/1994 | Anderson .................................. | 361/681 |
| 5,421,096 | 6/1995 | Ross .......................................... | 33/290 |
| 5,458,443 | 10/1995 | Belge ........................................ | 408/35 |
| 5,589,901 | 12/1996 | Means ....................................... | 348/144 |
| 5,598,207 | 1/1997 | Kormos et al. .......................... | 348/148 |
| 5,729,016 | 3/1998 | Klapper et al. .......................... | 348/148 |
| 5,909,244 | 6/1999 | Waxman et al. ......................... | 348/222 |

Primary Examiner—Howard Britton
Attorney, Agent, or Firm—Morgan & Finnegan, LLP

[57]                  ABSTRACT

An image sensing apparatus includes a spherical supporting unit, a Y-shape supporting unit and a pedestal supporting unit. The spherical supporting unit includes: a lens unit, a photoreceptor and electrical circuits, is supported on X axis by the Y-shape supporting unit, and is rotated about the X axis by driving force of a motor. The Y-shape supporting unit is rotatably supported on Y axis by the pedestal supporting unit. In the spherical supporting unit, a fixed portion which is stably connected with the X axis of the spherical supporting unit, and a rotation portion which rotates along with rotation of the spherical supporting unit, are provided. The image sensing apparatus comprises a conductive bearing in which the rotation portion is electrically connected with the fixed portion. The rotation portion and the electrical circuits are connected with signals; and signal wires from the Y-shape supporting unit are connected with the fixed portion. With respect to the Y-shape supporting unit and the pedestal supporting unit, a conductive bearing is similarly provided at the rotating portion, so that electrical connection is achieved between the Y-shape supporting unit and the pedestal supporting unit. Accordingly, electrical connection between the electrical circuits of the spherical supporting unit and an external unit is achieved without limiting rotation of the spherical supporting unit or the rotation of the Y-shape supporting unit.

10 Claims, 14 Drawing Sheets

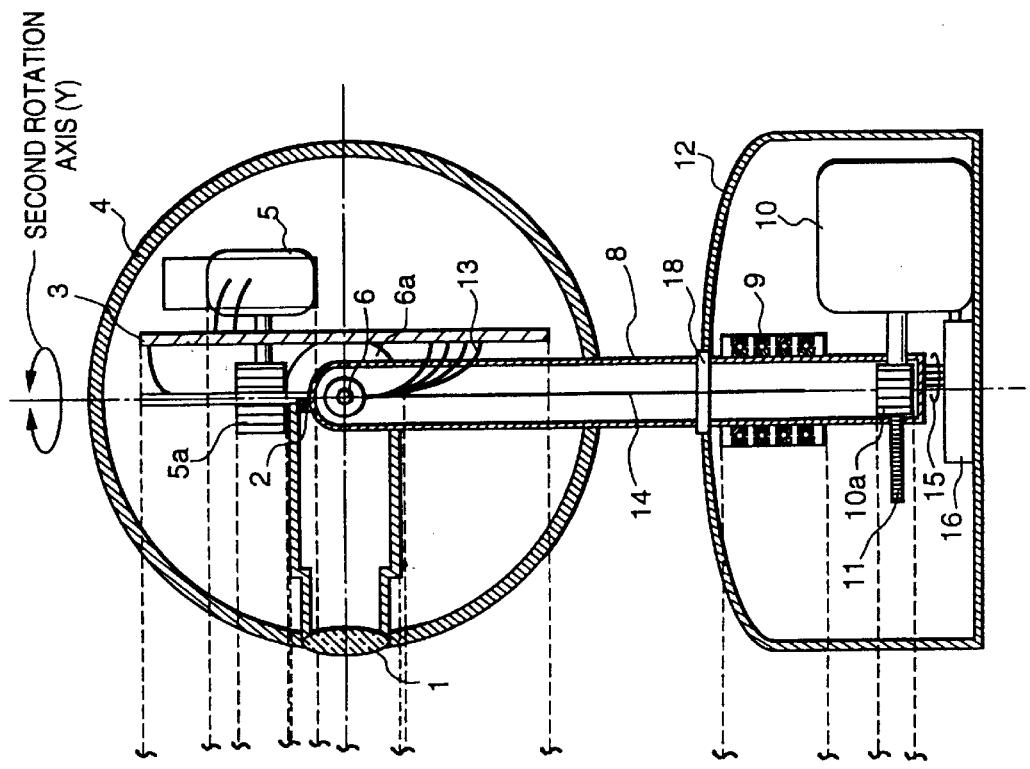
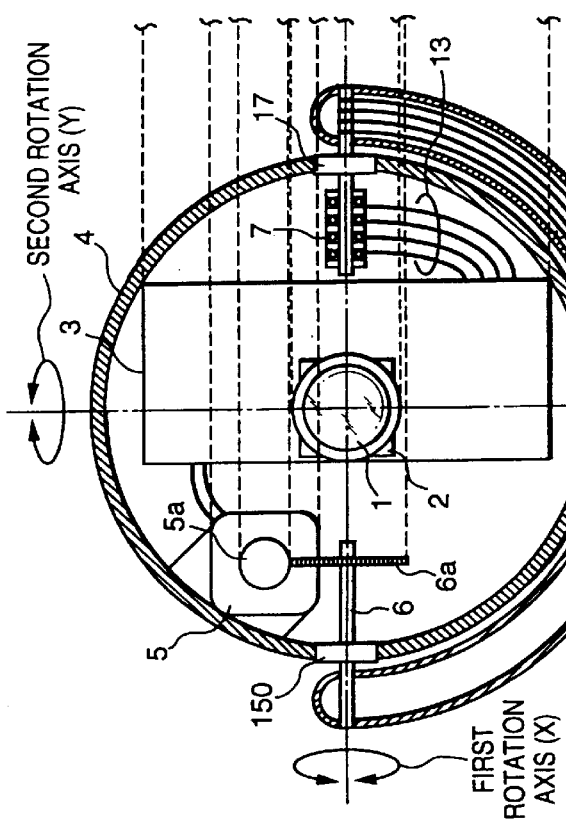

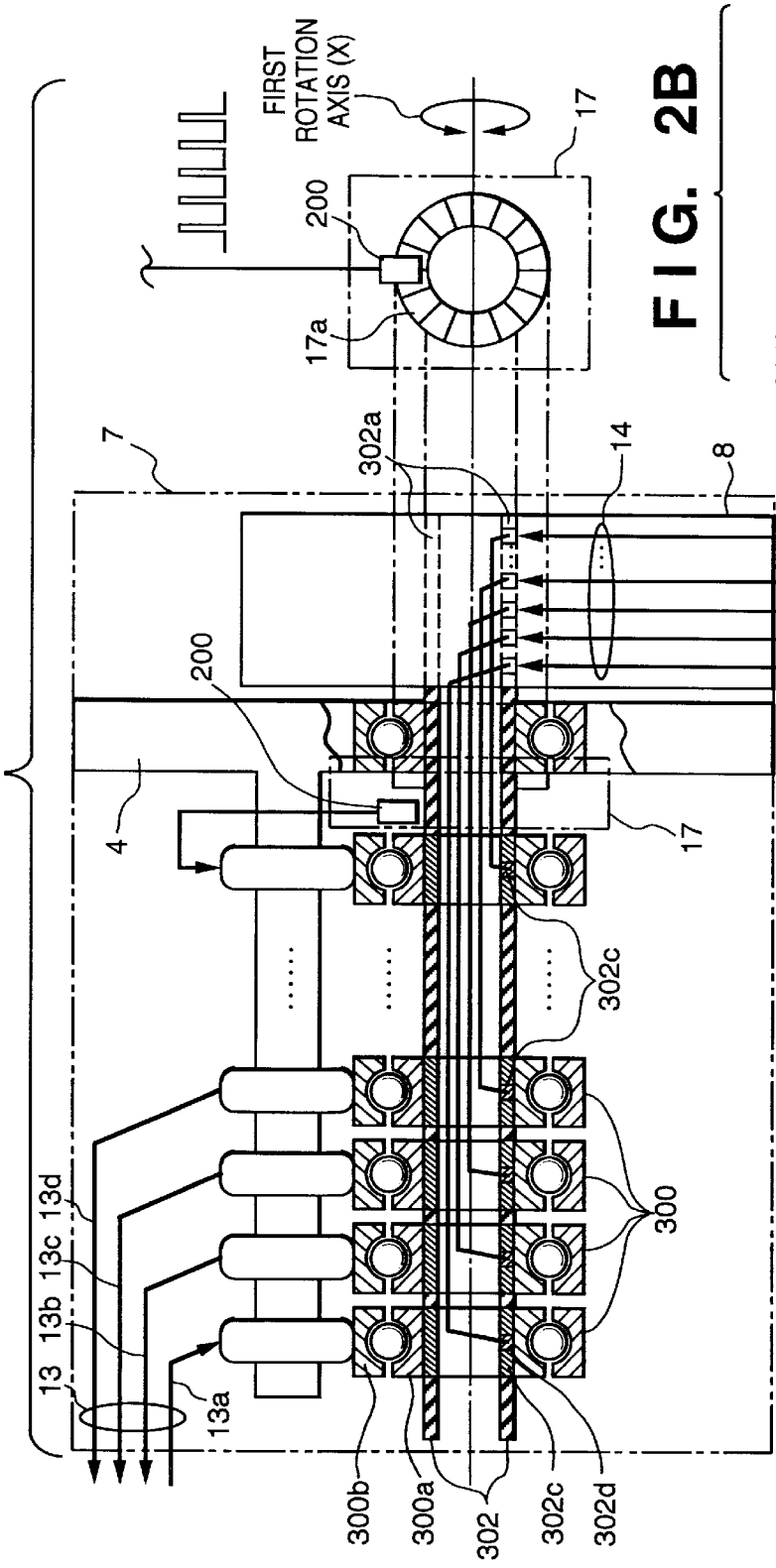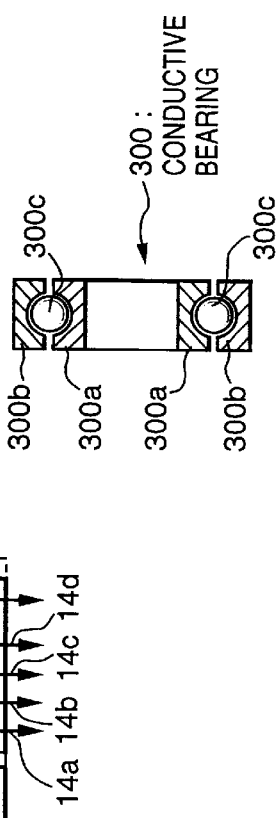

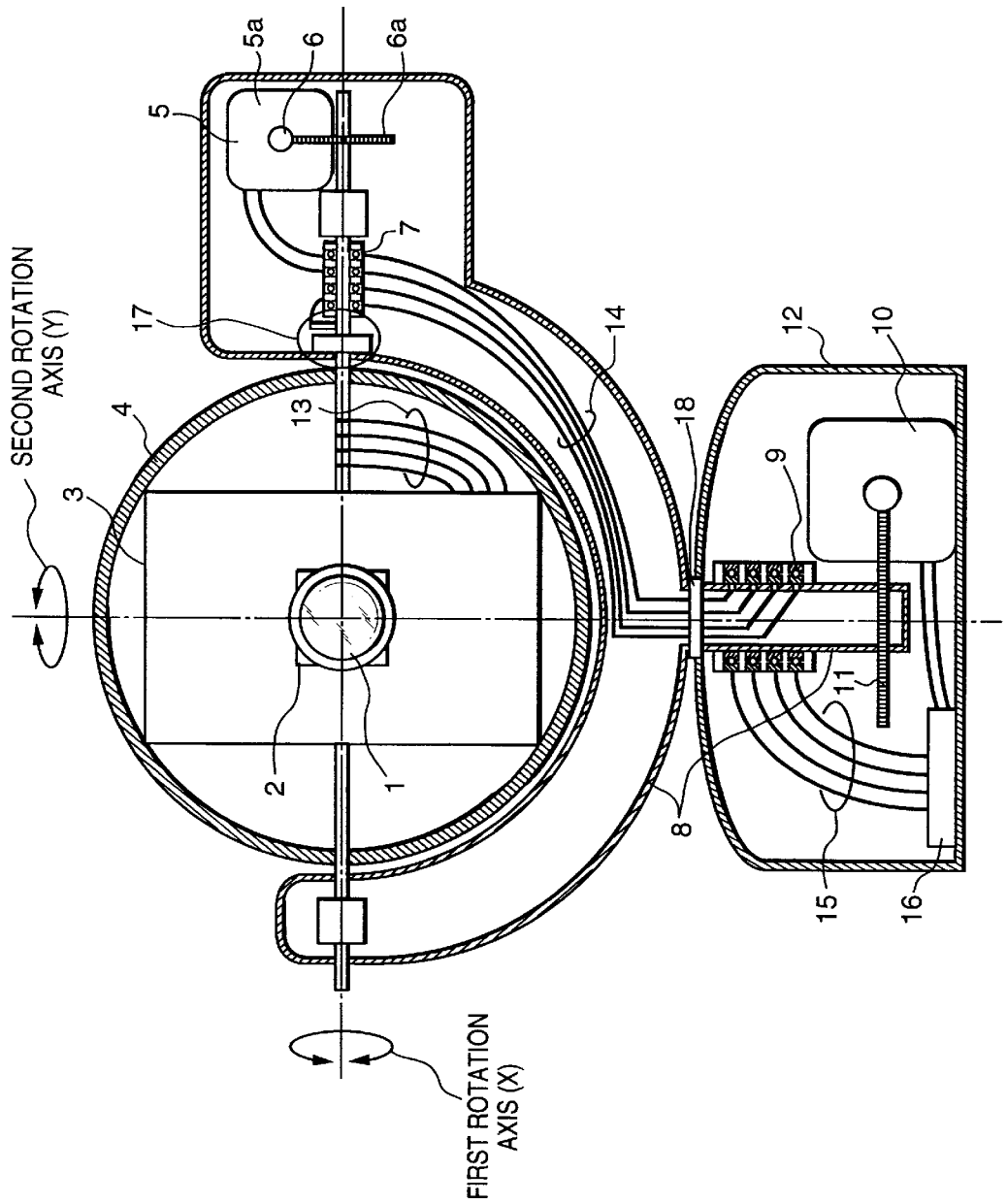

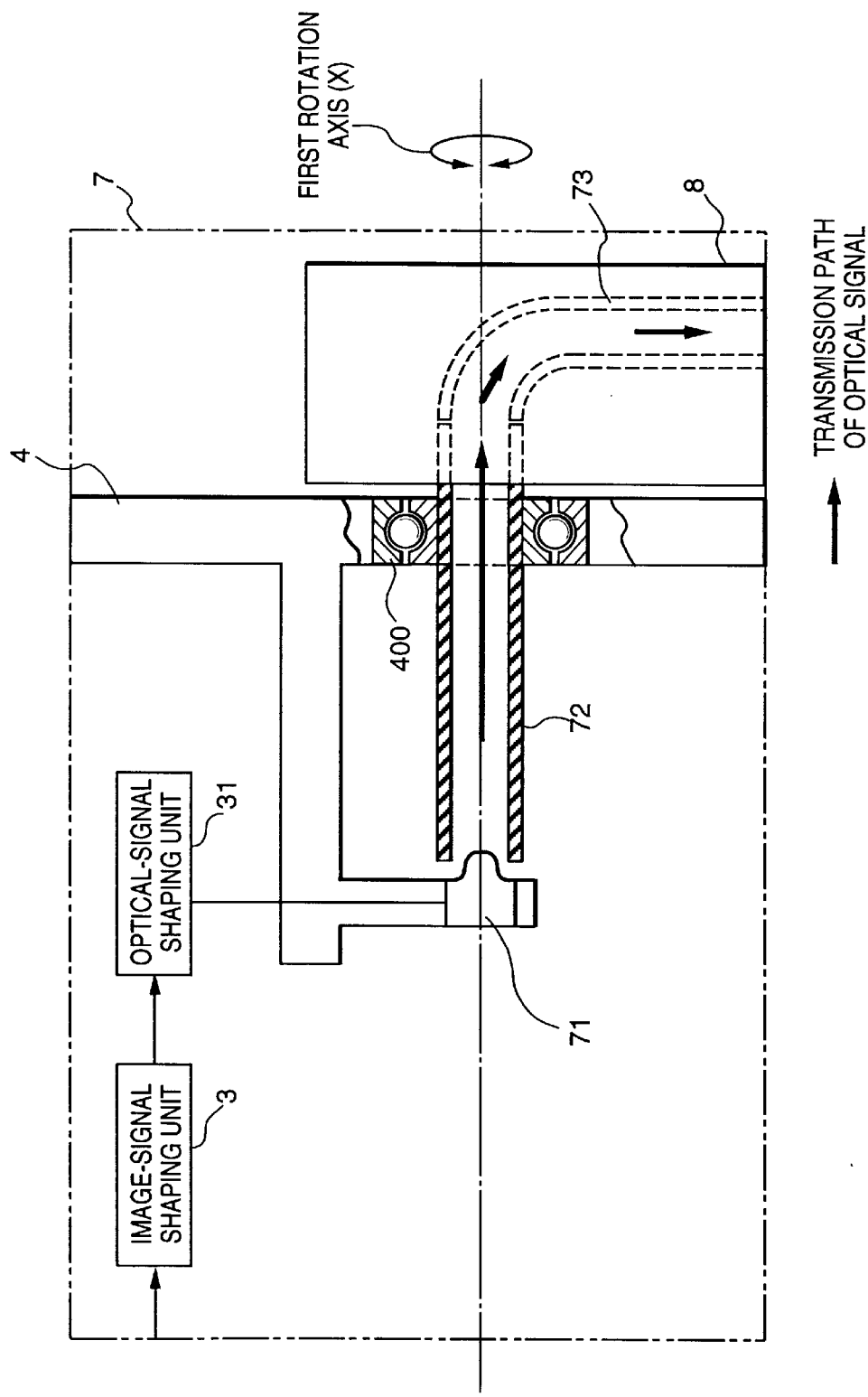

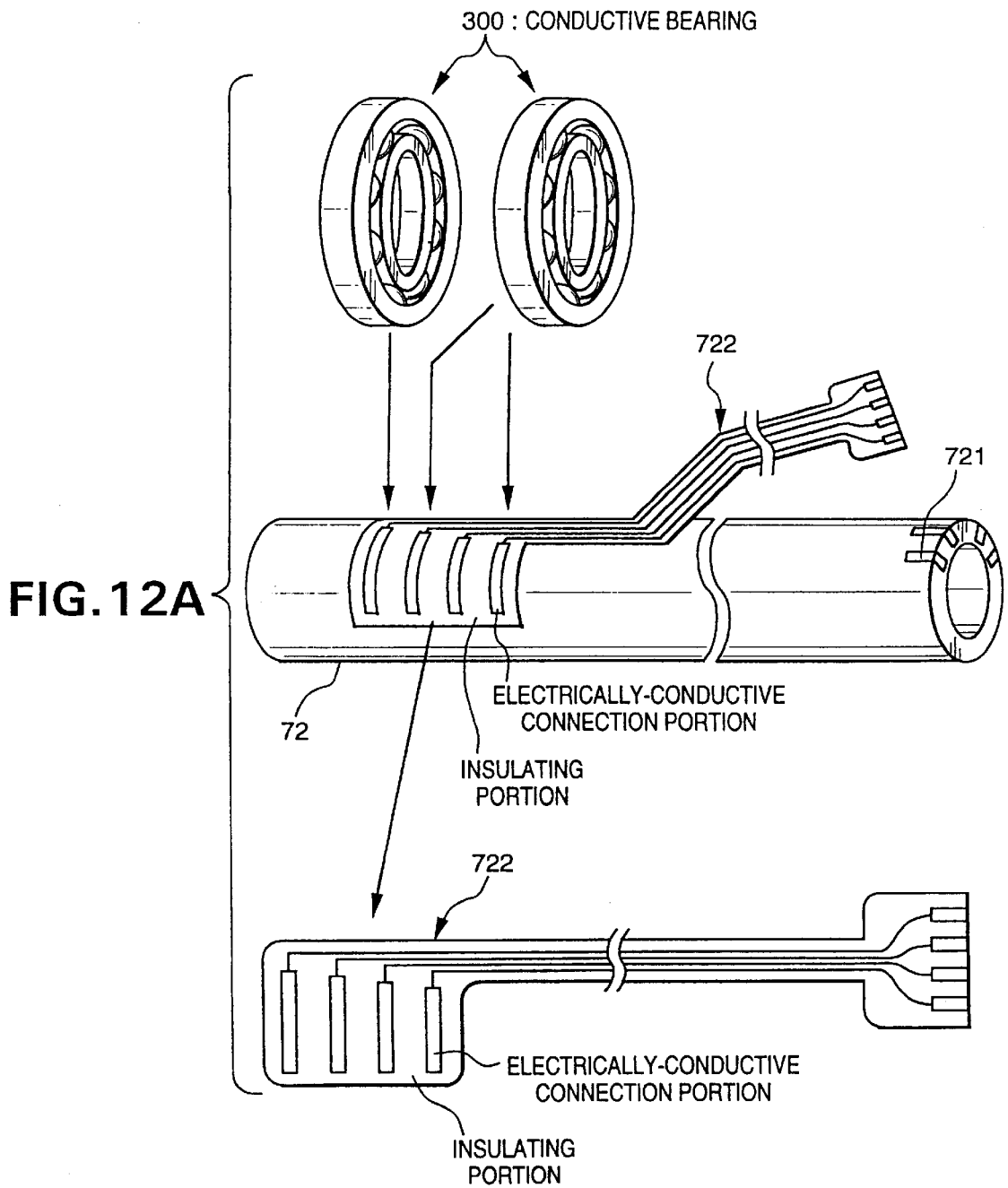

IMAGE SENSING APPARATUS

BACKGROUND OF THE INVENTION

The present invention relates to an image sensing apparatus for performing image sensing by directing a lens and an image receiving element at a photographing subject.

A conventional camera, where the main unit of the camera is placed on a pan head which is rotatable in vertical and horizontal directions, the pan head is panned or tilted by manual operation or a motor or the like. In addition, a rotation-type image-sensing unit where a camera and a pan head are integrated, and which includes a driving unit for rotating the pan head, is available.

In such conventional apparatus consisting of a camera and a pan head, the pan head and the camera are separable. However, in a case of utilizing an electronic camera, codes from the camera such as signal wires and power-supplying wires and so on interferes with the camera operation, so that rotation angles of the camera in the vertical and horizontal directions are limited. In other words, the view angles (tilt/pan angles) in the vertical and horizontal directions are restricted. For instance, such camera cannot follow a subject moving around the camera and photograph a continuous image of the subject by rotating the camera. If other apparatuses, connected via wires to the electronic camera, are placed on the same pan head along with the camera, a continuous image of the subject can be sensed. However in this case, the entire mechanism including a motor and the like for rotating the pan head becomes large. Moreover, in such system, a user cannot monitor images, sensed by the camera, in real-time at a remote location.

Furthermore, in a case where the electronic camera is placed on the conventional pan head and focuses upon a subject located at a close distance, since the image-sensing surface of the camera is apart from a rotating axis of the camera, the image sensed by the camera, rotating on the rotating axis, is out of focus. For instance, assuming that a camera is focused upon an image as a subject which is placed in the lower portion of the image-sensing frame. If the camera is tilted downward to move the focused image to the upper portion of the image-sensing frame, the image becomes out of focus. More specifically, when the camera is rotated in the horizontal and vertical directions, the distance between the camera and the subject changes (the subject is not in the same spherical surface). Accordingly, the sensed image gives an odd impression to the user, thus it is difficult to see. At present, there is no image sensing apparatus available which can automatically follow a subject which arbitrarily moves in the vertical and horizontal directions and which can perform image sensing without giving odd impressions to the user.

SUMMARY OF THE INVENTION

The present invention has been made in consideration of the above situation, and has as its object to provide an image sensing apparatus having a small structure, which enables to always obtain focused images without any limitation in view angles.

Another object of the present invention is to provide an image sensing apparatus which can transmit signals among the first supporting unit which accommodates a lens unit and rotates upon the first axis, the second supporting unit which rotates the first supporting unit on the second axis, and the third supporting unit which supports the second supporting unit, without limiting rotation of the first and second supporting units.

Another object of the present invention is to provide an image sensing apparatus which can transmit signals without contacting one another among the first supporting unit which accommodates a lens unit and rotates upon the first axis, the second supporting unit which rotates the first supporting unit on the second axis, and the third supporting unit which supports the second supporting unit, without limiting rotation of the first and second supporting units.

According to the aspect of the present invention, the first supporting unit is readily removable so that an image-sensing unit alone can be removed and placed on, e.g., a pan head.

In addition, another object of the present invention is to provide an image sensing apparatus which can employ various camera units in accordance with an image to be sensed as a subject or purpose of the image sensing or the like.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 1A and 1B are, respectively, a front view and a side view of an image sensing apparatus according to the first embodiment of the present invention;

FIG. 2A is a structural view of an X-axis cable connection portion of the image sensing apparatus as the first embodiment of the present invention;

FIG. 2B shows a sectional view of a conductive bearing;

FIG. 3 is a structural view of an image sensing apparatus as the second embodiment where the second supporting unit comprises an X-axis rotating unit;

FIGS. 4 and 5 are a structural view where an image signal of an image sensing apparatus as the third embodiment is transmitted via an optical signal;

FIGS. 9A and 9B are a structural view of the image sensing apparatus as the fourth embodiment where the spherical supporting unit incorporates a removable battery;

FIGS. 12A and 12B are a break-down perspective view showing an arrangement of the X-axis bearing with respect to electrical-signal transmission paths in the image sensing apparatus of the present embodiment.

DETAILED DESCRIPTION OF THE PREFERRED EMBODIMENTS

Figure 5:
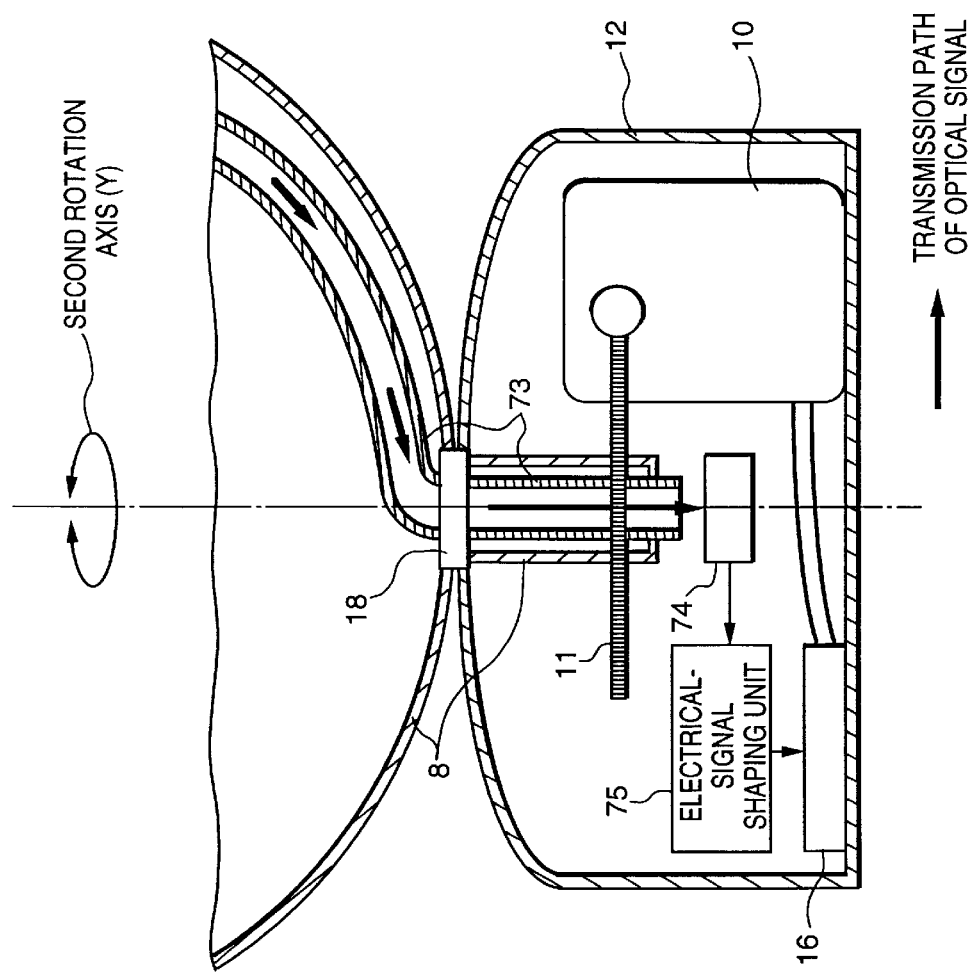

Preferred embodiments of the present invention will be described in detail in accordance with the accompanying drawings.

FIGS. 1A and 1B are respectively a front view (FIG. 1A) and a side view (FIG. 1B) of the image sensing apparatus as the first embodiment of the present invention.

In FIGS. 1A and 1B, reference numeral 1 denotes an optical lens unit comprising function of lens/focusing/zooming and the like; and 2, an image receiving element (e.g. CCD) which converts optical signals to electrical signals, and which is arranged at the intersecting point of the first rotating axis (hereinafter referred to X axis) and the second rotating axis (hereinafter referred to Y axis). Reference numeral 3 denotes an image-signal shaping unit which converts an output signal of the image receiving element 2 to an NTSC signal or the like, or which shapes the output signal. Reference numeral 4 denotes a spherical supporting unit (first supporting unit) incorporating a camera unit including the optical lens unit 1, image receiving element 2 and the image-signal shaping unit 3, as well as a motor or the like. Reference numeral 5 denotes an X-axis rotating motor (X motor) which is fixed in the spherical supporting unit 4, for rotating the spherical supporting unit 4 on the X axis via a round-shape gear 6a fixed upon an X-axis-driving-force transmitting unit 6. The X-axis-driving-force transmitting unit 6, fixed to a Y-shape supporting unit 8, supports the spherical supporting unit 4 via a bearing 150. Reference numeral 7 denotes an X-axis cable connection portion which is partially fixed to the X axis of the spherical supporting unit 4; 8, a Y-shape supporting unit (second supporting unit) which is stably connected to the X-axis cable connection portion 7 and supports the spherical supporting unit 4; 9, a Y-axis cable connection portion which is partially fixed to the Y axis of the Y-shape supporting unit 8; 10, a Y-axis rotating motor (Y motor) which rotates the Y-shape supporting unit 8 on the Y axis; 10a, a worm gear provided to the rotating axis of the Y motor 10; 11, a round-shape gear fixed in the Y-axis supporting unit 8, for rotating the Y-shape supporting unit 8 by transmitting the rotation of the Y motor 10 to the Y-shape supporting unit 8 via the worm gear 10a. Reference numeral 12 denotes a pedestal supporting unit (third supporting unit) which rotatably supports the Y-shape supporting unit 8.

Reference numeral 13 denotes cables which electrically connect the image-signal shaping unit 3 and the X motor 5 with the X-axis cable connection portion 7 in the spherical supporting unit 4; 14, cables which electrically connect the X-axis cable connection portion 7 with the Y-axis cable connection portion 9 in the Y-shape supporting unit 8; and 15, cables which electrically connect the Y-axis cable connection portion 9 and a terminal board 16 to be described later. The terminal board 16 serves as a connector which outputs electrical signals or the like outside of the image sensing apparatus. Reference numeral 17 denotes an X-axis direction sensor which detects a rotating direction of the spherical supporting unit 4 with respect to the X axis; and 18, a Y-axis direction sensor which detects a rotating direction of the spherical supporting unit 4 with respect to the Y axis.

Note in the present embodiment, image signal wires, direction control signal wires, lens control signal wires, motor control signal wires, and various power-supplying wires and the like are connected via the terminal board 16 to a control section and a power-supply portion of an external unit and the like. Image sensing directions and the like of the image sensing apparatus are controlled by the control section of the external units.

FIG. 2A shows a basic structure of the peripheral portion of the X-axis cable connection portion 7 and the X-axis direction sensor 17. Since the basic structures of the Y-axis cable connection portion 9 and the Y-axis direction sensor 18 are substantially identical to that shown in FIG. 2A, description thereof will be omitted. The structure shown in FIG. 2A will be described later in detail.

First, operation of the image sensing apparatus according to the first embodiment will be described.

An image of a subject passing through the optical lens unit 1 is focused at the image receiving element (CCD) which is provided at the intersecting point of the first rotating axis (X axis) and the second rotating axis (Y axis). The image receiving element 2 converts the focused image into electrical signals by converting optical signals into electrical signals. The image-signal shaping unit 3 converts the electrical signals into NTSC signals which can be directly transmitted to general television monitors and the like. In the embodiment, since the CCD 2 is located at the intersecting point of X axis and Y axis, the CCD 2 may be located on a line which is orthogonal to X and Y axis without departing from the scope of the invention. The NTSC signals are outputted to an external unit via the cables 13, X-axis cable connection portion 7, cables 14, Y-axis cable connection portion 9, cables 15 and terminal board 16 (hereinafter the path will be referred to as a conduction path). Note that instead of the NTSC signals, the output signals of the image receiving element 2 may directly be outputted to the external unit. In this case, the image-signal shaping unit 3 executes impedance matching and the like with the connecting section of the external unit. In addition, control signals for focusing/zooming the optical lens unit 1 and control signals related to driving motors and the like are inputted from the external unit via the conduction path.

To rotate the image sensing apparatus upward or downward, the X motor 5 is rotated. The X motor 5 is fixed inside the spherical supporting unit 4. In the present embodiment, a worm gear 5a (FIG. 1) is provided at the tip of an axle of the X motor 5, to engage with the round-shape gear 6a fixed to the X-axis-driving-force transmitting unit 6. The X-axis-driving-force transmitting unit 6, fixed to the Y-shape supporting unit 8, is inserted into the spherical supporting unit 4 through the bearing 150 in order to rotatably support the spherical supporting unit 4 on the X axis. The round-shape gear 6a, fixed to the X-axis-driving-force transmitting portion 6, normally utilizes a torque of the X-motor 5 and a gear box which is designed with a gear ratio taking into consideration of the durability and rotation control speed and the like. According to the present embodiment, the worm gear 5a is rotated by rotation of the X motor 5, and the X motor 5 (thus, spherical supporting unit 4) is rotated along the circumference of the round-shape gear 6a. By changing the rotating direction of the X motor 5, the spherical supporting unit 4 is rotated upward or downward so that the image-sensing direction of the camera can be changed in the vertical direction.

The X motor 5 keeps rotating as long as the X motor 5 is driven in accordance with an instruction from the external unit. Thus, the spherical supporting unit 4 can be freely rotated as many times as possible without any limitation in the rotating angle.

Herein, the spherical supporting unit 4 is assumed to have a spherical shape in the present embodiment; however, the shape is not limited to this. However, a shape close to a sphere is preferable since the spherical shape enables the X motor 5 to easily rotate on the X axis. Also in the case of utilizing the image sensing apparatus as a monitor, the spherical shape is advantageous since it helps not to give people uncomfortable feelings of being monitored. In addition, the spherical shape enables easy cleaning of the surface of the image sensing apparatus. If the surface of the image sensing apparatus has a dark color e.g. black, and the spherical supporting unit 4 is covered with a transparent material such as a glass or the like (which may also serve as a lens cover), the lens portion can be hidden. Therefore, the direction at which the image sensing lens is directed cannot be seen from the outside of the camera. Thus, people who are being monitored will not feel uncomfortable. An even more effective method is to have the mirror coating or the like on the camera, which is utilized in sunglasses or the like.

There are following two ways to control view angles of the spherical supporting unit 4. One way is to manually instruct the camera to rotate vertically or horizontally while an operator views a sensed image of the image sensing apparatus. The other way is to perform automatic control of the image sensing apparatus, e.g. automatic image sensing of a subject by utilizing image data obtained from the image sensing apparatus or an external unit, control data and other data obtained from an infrared ray sensor or the like. When image sensing direction is to be controlled by data related to subject's direction, the X-axis direction sensor 17 detects the rotating direction of the spherical supporting unit 4 with respect to the X-axis direction, and the Y-axis direction sensor 18 detects the rotating direction with respect to the Y-axis direction, and the resulting data is transmitted to a control unit of an external unit via the conduction path. As a result, the control unit controls operation of the X motor 5 and Y motor 10 on the basis of the data detected by the sensors with respect to the X and Y directions, thereby moving the lens 1 in a desired direction.

The basic structure of the X-axis direction sensor 17 will be described next with reference to FIGS. 2A and 2B.

The simplest way to realize the X-axis direction sensor 17 is to provide the Y-shape supporting unit 8 with a donut-like disc 17a, having plural radial slits from the center of the X axis to the periphery of the disc. A photosensor 200 fixed onto the spherical supporting unit 4 reads the number of slits as a pulse value without contact, whereby easily calculating the rotating angle of the spherical supporting unit 4 on the X axis based on a reference angle. For instance, assuming that the number of radial slits is 360, the image sensing apparatus of the present embodiment can control the angle of rotation on the X axis to a resolution of 1°. As a matter of course, a ready-made (rotary) encoder or the like may be utilized for the sensor 17.

The X-axis cable connection portion 7 comprises a plurality of electrically-conductive (donut-shape) bearings 300 which are arranged on the periphery of a hollow pipe 302 consisting of an electrically-conductive portion and insulating portion as shown in FIGS. 2A and 2B. The bearing 300 includes a bearing ball 300c which allows the outer portion 300b to rotate freely from the inner portion 300a (FIG. 2B). One end 302a of the pipe 302 is fixed in the Y-shape supporting unit 8. The portion 302c where the pipe 302 is in contact with the inner portion 300a of the bearing 300 fixed onto the pipe 302, is electrically conductive, and other portions of the pipe between bearings 300 are insulated. In addition, the outer portion 300b of the bearing 300 is rotated along with rotation of the spherical supporting unit 4, and is stably fixed to the spherical supporting unit 4 via insulating materials (not shown). In the present embodiment, through holes 302d are formed on the pipe 302, and the end of signal wires extended inside the pipe 302 is soldered via the through holes 302d, forming the electrically-conductive portion 302c.

Electrical signals in the spherical supporting unit 4, such as image signals, are transmitted via a signal wire 13a of the cables 13, and electrically connected to a signal wire 14a of the cable 14 in the Y-shape supporting unit 8 through the bearing 300 and pipe 302 (hole 302d). Motor control signals and driving signals are transmitted via signal wires 14b and 13b; motor power-supply, via signal wires 14c and 13c; and camera control signals, via signal wires 14d and 13d, to the respective units of the spherical supporting unit 4 through the Y-axis supporting unit 8 and X-axis cable connection portion 7. On account of the X-axis cable connection portion 7, image signals from the spherical supporting unit 4, power supply for the X motor 5 and sensor signals or the like are transmitted to the Y-shape supporting unit 8. Therefore, there will be no limitation in rotating angles of the spherical supporting unit 4. In other words, the spherical supporting unit 4 can be rotated freely as many times as possible.

In the present embodiment, the electrically-conductive donut-shape bearing is utilized in the X-axis cable connection portion 7. However, instead of the donut-shape bearing, various materials and configuration may be utilized, e.g., an electrically-conductive board spring (including spring structure and electrically-conductive structure), an electrically-conductive brush, an electrically-conductive roller and the like.

The method of connecting cable 14 and cable 15 will be described next. Herein, the cable 14 is electrically connected with the terminal board 16 in the pedestal supporting unit 12 via the Y-axis cable connection portion 9 which has the same structure as that of the X-axis cable connection portion 7. As described above, the Y-axis cable connection portion 9, integrated with the round-shape gear 11, is rotated on the Y axis and is electrically connected to the terminal board 16 in the pedestal supporting unit 12. The structures and operation of the Y motor 10, round-shape gear 11, Y-axis cable connection portion 9, and Y-axis direction sensor 18 in the pedestal supporting unit 12 are easily understood by referring to the aforementioned X motor 5, X-axis-driving-force transmitting unit 6, X-axis cable connection portion 7 and X-axis direction sensor 17 in the spherical supporting unit 4.

Herein with respect to the positional relationship among the spherical supporting unit 4, Y-shape supporting unit 8 and pedestal supporting unit 12, the X axis and Y axis, serving as the rotational axes of these supporting units, must be intersected orthogonally. Furthermore, the image receiving element 2 (CCD) is arranged on the third axis, which joins at the intersecting point of these X axis and Y axis and which orthogonally intersects with the X axis. By virtue of this structure, the distance from the lens to a subject is always constant even if the lens unit 1 of the image sensing apparatus rotates 360° on the X axis/Y axis. Accordingly, the subject is always focused. In the present embodiment, the image receiving element 2 is placed at the central portion of these rotating axes. However, the equal effect can be obtained if a mirror or the like is arranged in place of the image receiving element 2, and an image reflected on the mirror is focused at the image receiving element placed at a different position.

In addition, precise angle control is possible if a stepping motor is used as the X motor 5 and Y motor 10. Moreover, an ultrasonic motor, having advantages such as small size, high speed and high torque, may be utilized to minimize the number of gear-associated parts such as the driving-force transmitting unit of the X axis/Y axis or the like; so that the apparatus can be made small and light-weighed.

[Second Embodiment]

The image sensing apparatus as the second embodiment of the present invention will be described next.

In the first embodiment, the spherical supporting unit 4 comprises the X motor 5, X-axis-driving-force transmitting unit 6 and X-axis cable connection portion 7 within the unit 4. In the second embodiment, as shown in FIG. 3, the Y-shape supporting unit 8 comprises the X motor 5, X-axis-driving-force transmitting unit 6 and X-axis cable connection portion 7. The Y motor 10, round-shape gear 11 and Y-axis cable connection portion 9 are included in the Y-shape supporting unit 8 as similar to the first embodiment. Note that with reference to FIG. 3, those components identical to those in the foregoing embodiment are referred to by the same reference numerals and description thereof will be omitted.

In the second embodiment, an image signal from the image receiving element 2 is transmitted through the cables 13, X-axis cable connection portion 7, cables 14 in the Y-shape supporting unit 8, Y-axis cable connection portion 9, cables 15 and terminal board 16, and outputted to an external unit. The X-axis direction sensor 17 detects the current rotating angle around the X-axis. On the basis of the data from the sensor 17, a control unit of the external unit controls rotation of the X motor 5, whereby changing the image-sensing direction of the image sensing apparatus. Accordingly, the second embodiment can attain the same effect as that of the first embodiment.

[Third Embodiment]

The image sensing apparatus according to the third embodiment of the present invention will be described next.

In the foregoing first embodiment, image signal wires, direction control signal wires, lens control signal wires, motor control signal wires, and various power-supplying wires and the like are connected to a control section and a power-supply portion of an external unit and the like via the above-described X-axis cable connection portion 7 and Y-axis cable connection portion 9. However, if the above-described structure of the contact point is adopted to all the signal wires, noise may be generated. Moreover, the larger the number of contact points, the more friction is generated at the contact points. Because of this, the load torque increases and motor's life is shortened. Thus, problems arise, e.g., a larger type of motor must be utilized.

In order to solve such problems, according to the image sensing apparatus of the third embodiment, the image-signal shaping unit 3 temporarily converts an electrical signal from the image receiving element 2 to an optical signal (E/O conversion), and the optical signal is transmitted without further conversion to the internal unit of the pedestal supporting unit 12. Accordingly, a noise-resistant image sensing apparatus is realized.

FIG. 4 shows a structure of the X-axis cable connection portion 7 according to the third embodiment. Note that the structure of the X-axis cable connection portion 7 shown in FIG. 4 also applies to the Y-axis cable connection portion 9.

The image signal from the image-signal shaping unit 3 is converted to an optical signal by an optical-signal shaping unit 31, and shaped into a transmittable electrical signal. In other words, if the image signal from the image-signal shaping unit 3 is a CCD signal, the CCD signal is shaped into an electrical signal to form an optical-signal. In a case where the image signal from the image-signal shaping unit 3 includes a direct-current component such as an NTSC signal or the like, the image signal is once converted to an electrical signal which does not include the DC component such as an RF (radio frequency) and is outputted to an E/O converter 71 to be shaped into an optical signal. The E/O converter 71 is fixed in the spherical supporting unit 4, and converts the electrical signal into an optical signal utilizing a photodiode or the like. The E/O converter 71 is fixed at a position such that the optical axis of an output light coincides with the X axis of the spherical supporting unit 4 (as shown in FIG. 4).

Herein, since the E/O converter 71 and a pipe 72 are not in contact with each other, even if the spherical supporting unit 4 rotates on the X axis, an optical signal emitted from the E/O converter 71 is always irradiated via the pipe 72 to be transmitted. The pipe 72 has a hollow pipe-like shape (optical fiber) whose inner surface is coated with mirror-like surface, making it possible to efficiently transmit an irradiated optical signal. In addition, an optical-signal transmission portion 73 in the Y-shape supporting unit 8 is also structured to transmit light as similar to the pipe 72, so that an optical signal is transmitted to an inner unit of the pedestal supporting unit 12. As similar to the aforementioned pipe 302, the pipe 72 rotatably supports the spherical supporting unit 4 via a bearing 400 so that the spherical supporting unit 4 rotates on the X axis.

FIG. 5 is an explanatory view showing a structure for transmitting an optical signal from the Y-shape supporting unit 8 to the terminal board 16 in the pedestal supporting unit 12.

An optical signal, transmitted through the optical-signal transmission portion 73 in the Y-shape supporting unit 8, reaches a photoreceptor (photosensor) 74 arranged at a position where the center of the second rotating axis (Y axis) passes through. The electrical signal which is received by the photoreceptor 74 and subjected to O/E (optical to electrical signal) conversion is shaped into an output-signal format (a signal where output impedance is adjusted, or an NTSC signal) by an electrical-signal shaping unit 75 and outputted to an external unit via the terminal board 16.

Although the above description has been provided assuming that the optical signal is an image signal of the image receiving element 2, the optical signal may include various control signals or mixed signals of an image signal and a control signal. In addition, it is preferable to construct the apparatus to enable bi-directional signal transmission in order to transmit an image signal or data related to a camera-rotation-angle from the spherical supporting unit 4 to the pedestal supporting unit 12, or to transmit control signals from external control units e.g. the direction control signal wire, lens control signal wire, motor control signal wire and the like, to the spherical supporting unit 4.

Figure 6:
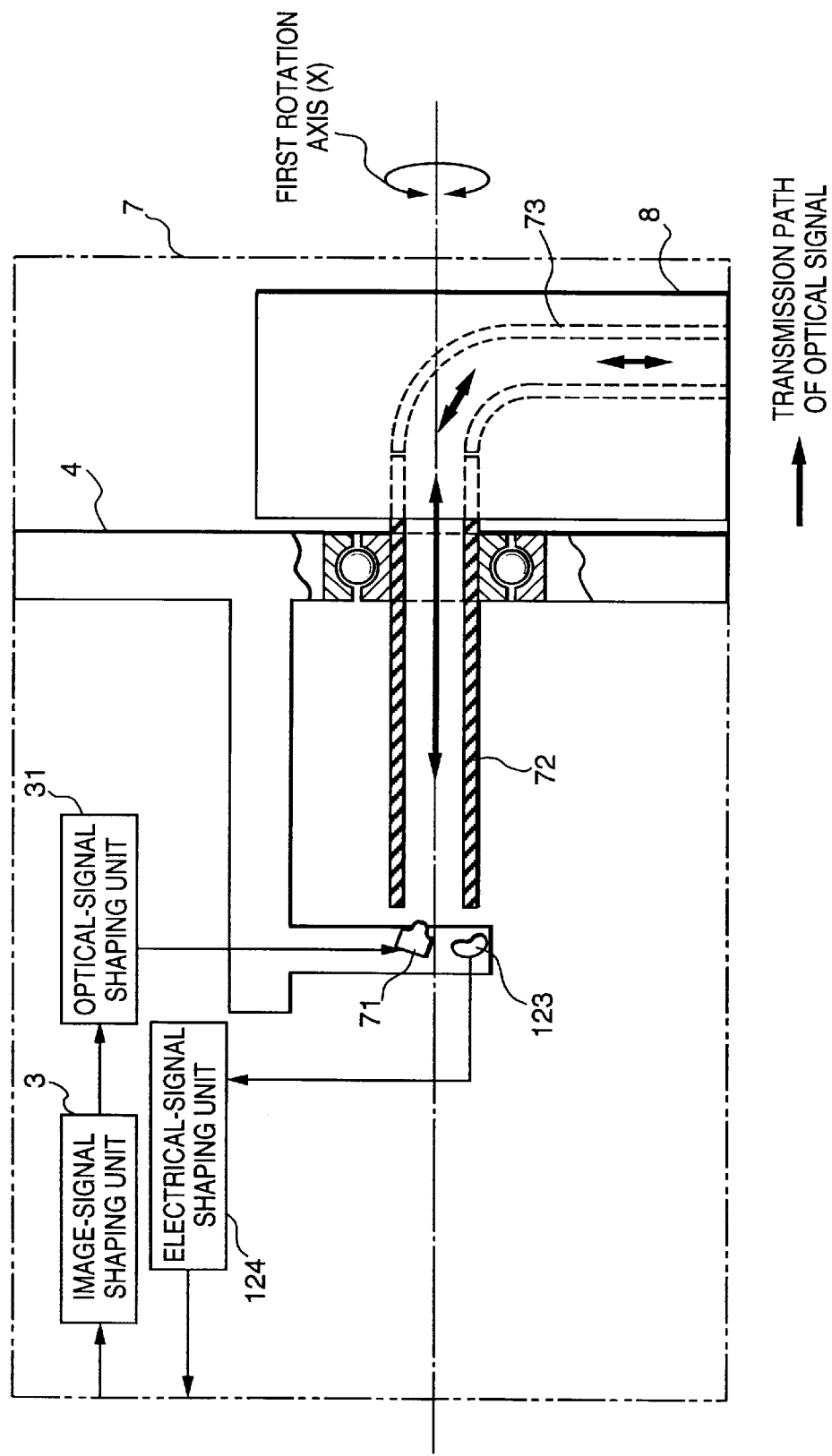
FIGS. 6 and 7 are a structural view where an image signal and a control signal of an image sensing apparatus as the fourth embodiment are transmitted via a bi-directional optical signal.
Figure 7:
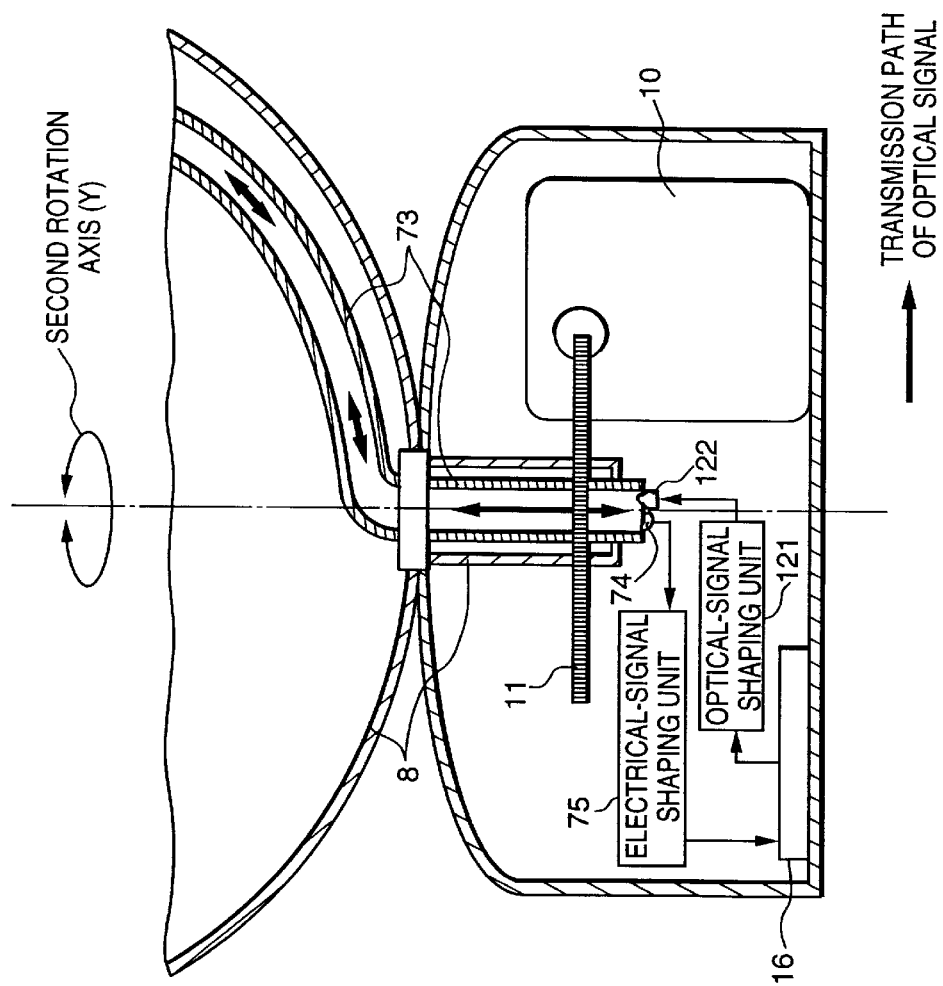

In this case, as shown in FIGS. 6 and 7, the E/O converter 71 ($\lambda$1) and 122 ($\lambda$2), and the photoreceptor 74 ($\lambda$1) and 123 ($\lambda$2), respectively having a different wavelength, are provided as a pair at both ends of the optical-signal transmission portion. By providing a pair of optical devices having the same wavelength at the transmitting side and receiving side, if each of the signals traveling both ways has different wavelength, bi-directional signals can be handled by the same optical fiber as an independent signal (wavelength division multiplexing). As a matter of course, plural pairs of the E/O converter and photoreceptor may be provided in correspondence with a type of signals.

As long as a desired optical signal alone is transmitted, the pipe 72 and the optical-signal transmission portion 73 in the Y-shape supporting unit 8 can attain the original purposes. Therefore, various selections are possible for their materials and configuration. For instance, equal effect can be attained by utilizing a transparent glass whose surface is coated to enhance the light reflectivity, or plastic, or flexible transparent rubber or the like.

[Fourth Embodiment]

The image sensing apparatus according to the fourth embodiment is now described. According to the fourth embodiment, the spherical supporting unit 4 and the Y-shape supporting unit 8 can be removed.

Figure 8:
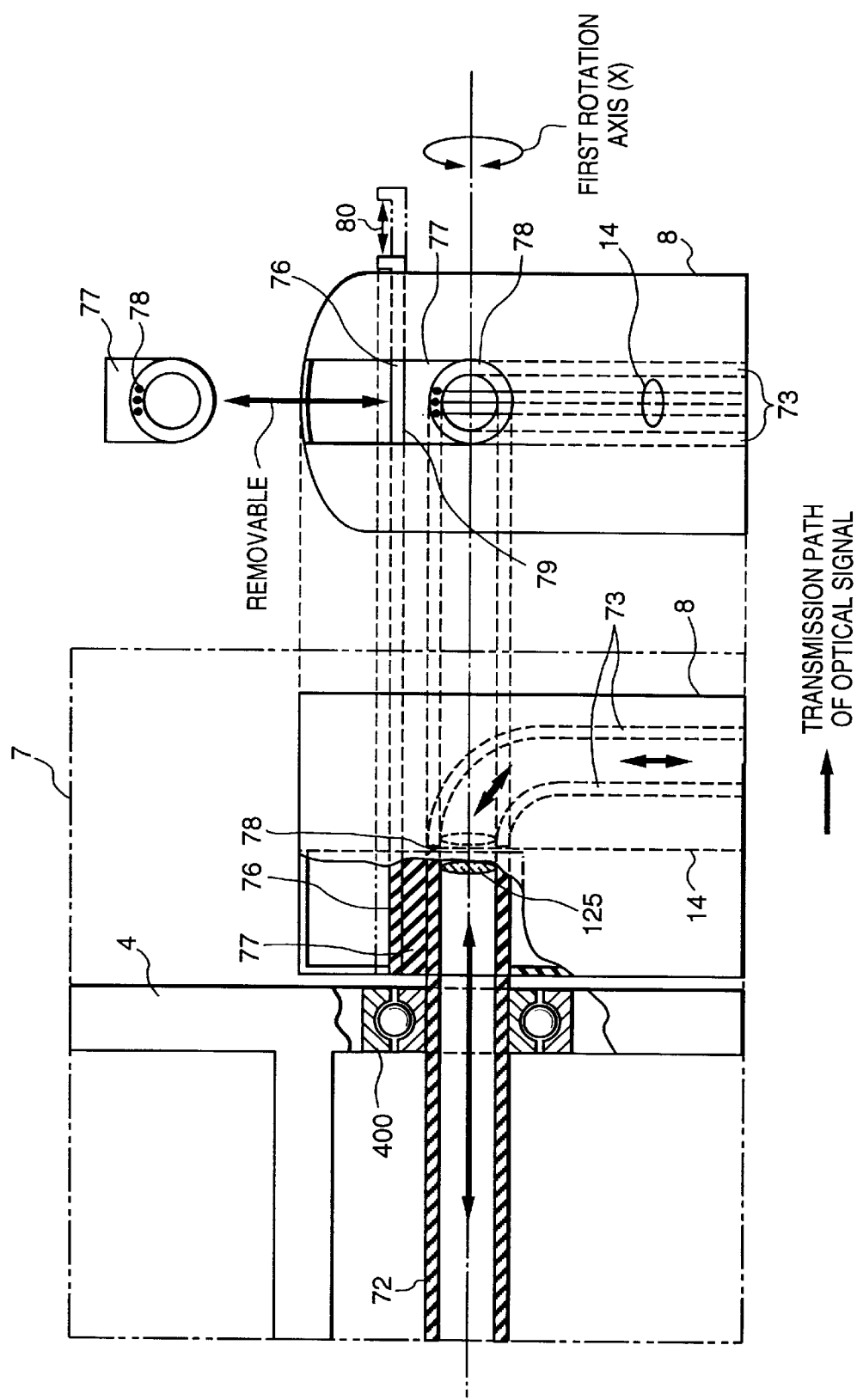
FIG. 8 is a structural view showing the main portion of the image sensing apparatus as the fourth embodiment where the spherical supporting unit and Y-shape supporting unit are removable.

FIG. 8 shows the structure of the removable portion of the X-axis cable connection portion 7, illustrating a detailed structure of a contact-point connecting portions of the spherical supporting unit 4 and the Y-shape supporting unit 8. Note that the components in FIG. 8 which are common to those in FIG. 4 are referred to by the same reference numerals.

The pipe 72 of the spherical supporting unit 4 is fixed on the X axis of the spherical supporting unit 4 via the bearing 400. The end portion of the pipe 72 has a projected portion 77 provided to fix the pipe 72 to the Y-shape supporting unit 8. The Y-shape supporting unit 8 has a guide (groove) 79 which enables to fix/release the projected portion 77 to/from the Y-shape supporting unit 8, and also has a fixing member 76 for fixing the projected portion 77 in a state of inserting the projected portion 77 into the Y-shape supporting unit 8. The fixing member 76 slides along the guide 79. Upon inserting the projected portion 77 into the Y-shape supporting unit 8, the fixing member 76 is slid in the left direction of the arrow 80 in FIG. 8, whereby fixing the projected portion 77 to the Y-shape supporting unit 8 so as to connect to the optical-signal transmission portion 73. When the fixing member 76 is slid in the right direction, the projected portion 77 becomes removable upward from the Y-shape supporting unit 8.

In order to connect electrical signals and power-supply lines between the spherical supporting unit 4 and Y-shape supporting unit 8, contact points 78 are provided at the end portion (the surface contacting the projected portion 77) and at a position corresponding to a fixing position of the Y-shape supporting unit 8. When the Y-shape supporting unit 8 is connected with the spherical supporting unit 4 via the projected portion 77, signal wires of the spherical supporting unit 4 and signal wires of the Y-shape supporting unit 8 are connected via the contact points 78. Herein, the end portion of the projected portion 77 has a lens 125 to serve as an optical antenna which enables optical communication. The Y-shape supporting unit 8 also incorporates the similar lens. Therefore, optical signals can be transmitted between the spherical supporting unit 4 and Y-shape supporting unit 8.

Figures 9A, 9B:
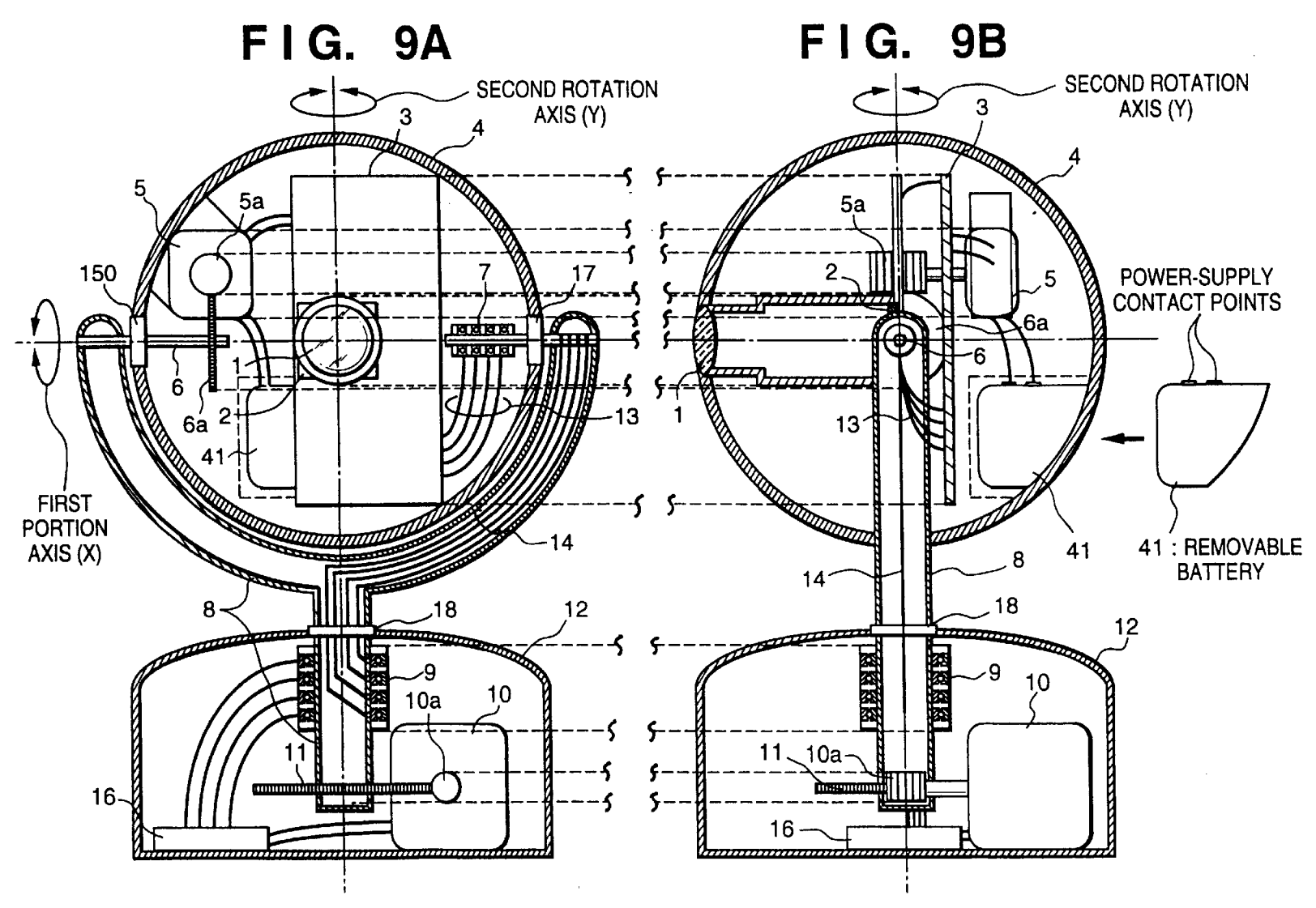

FIGS. 9A and 9B show the image sensing apparatus whose spherical supporting unit 4 includes a removable battery 41. Components in FIGS. 9A and 9B common to those in FIGS. 1A and 1B are referred to by the same reference numerals and description thereof will be omitted. By combining the structure shown herein with the structure of the third embodiment (FIG. 4), image signals and control signals or the like are transmitted by optical signals, and power supply for driving the motor 5 is supplied from the battery 41 in the spherical supporting unit 4. Accordingly, it is possible to omit contact portions (e.g. 78 in FIG. 8) from the X-axis cable connection portion 7. As a matter of course, both power from an external power source and the power from the incorporated battery 41 may be utilized.

In the foregoing embodiments, electrical or optical connection between the spherical supporting unit 4 and the pedestal supporting unit 12 are achieved by transmitting various electrical signals and control signals in the structure utilizing contact points employing conductors, or the optical-signal transmission mechanism where signals are single-directionally or bi-directionally transmitted. In reality, for the purpose of reducing noise and rotational friction, it is preferable to supply electricity (signal) necessary for driving the X motor 5 or the power-supply to be provided to substrates of the electrical circuit e.g. the image-signal shaping unit 3 or the like, via the conductive path including conductors. Also, it is preferable to transmit image signals, focus/zoom control signals of the optical lens unit 1, and signals from the sensors 17 and 18 via a bi-directional optical signal path.

In this case, a transmission path for optical signals and a transmission path for electrical signals must be provided. Description will be provided next on the method of arranging the transmission paths and how to incorporate the paths.

Figure 10:
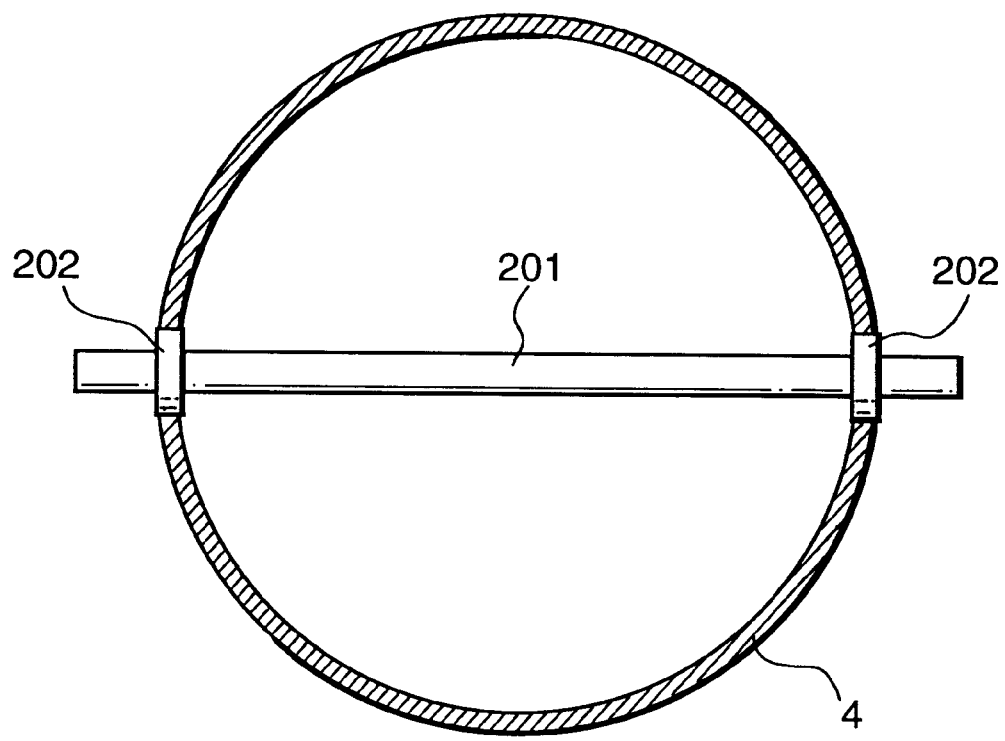
FIG. 10 is an explanatory view showing the spherical supporting unit and the relationship of the spherical supporting unit with the associated member for explaining another method of structuring the transmission paths of optical signals and electrical signals in the image sensing apparatus of the present embodiments.
Figure 11:
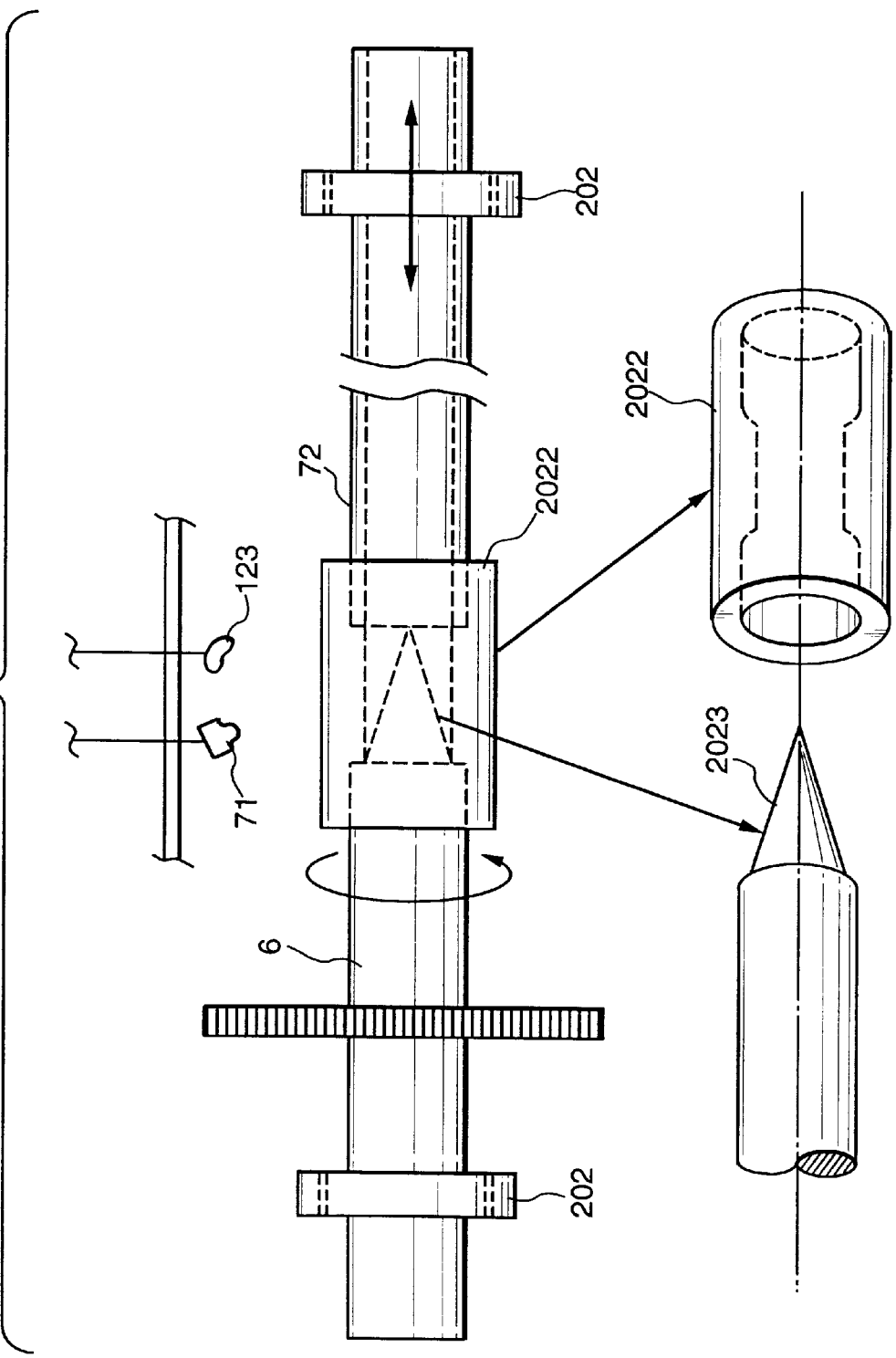
FIG. 11 is a structural view showing an arrangement of the image sensing apparatus according to the present invention where an X-axis-driving-force transmitting unit is connected to an X-axis bearing via an optical-signal transmitting axis.

FIG. 10 shows that an axis 201 penetrates through the spherical supporting unit 4. The axis 201 and the spherical supporting unit 4 are connected with a flexible connection portions 202 such as a ball bearing or the like. As has been described above, according to the first embodiment, FIG. 1 shows the structure where the spherical supporting unit's axis 201 is cut out, for explanatory convenience. In reality, so long as the axis 201 has a cylindrical rod shape, the axis 201 enables smooth rotation of the spherical supporting unit 4 with little vibration. In order to realize this, the X-axis-driving-force transmitting unit 6 (FIGS. 1 and 3) and the pipe 72 (FIG. 4) are stably adhered via a pipe 2022 as shown in FIG. 11 so that they are connected straight.

The E/O converter 71 and photoreceptor 123 mounted on the substrate, e.g., the image signal shaping unit 3 or the like, rotate around the pipe 2022 together with the spherical supporting unit 4, optical lens unit 1 and image receiving element 2, without contacting the pipe, maintaining an equal distance from the pipe 2022. In such structure, one must consider how to perform proper optical communication without changing an intensity level of optical signals and a optical-signal receiving level. The pipe 2022 is preferably formed with a transparent glass, acryl or a mold-type material, in order to allow optical signals to pass through the inner portion of the pipe 72. In addition, to efficiently transmit optical signals from the E/O converter 71 to the pipe 72, and from the pipe 72 to the photoreceptor 123, a cone portion 2023 is formed at one end of the X-axis-driving-force transmitting unit 6 which is connected to the pipe 2022, as shown in FIG. 11 (in this case, the cone is formed such that the peak of the cone portion 2023 points to the center of the X axis). Furthermore, by mirror-coating the cone portion 2023 to have high reflectivity, optical signals are accurately transmitted between the X-axis-driving-force transmitting unit 6 and the pipe 72 when the E/O converter 71 and photoreceptor 123 rotate around the connection portion 202 on the X axis. Taking into consideration transmission efficiency of optical signals between the X-axis-driving-force transmitting portion 6 and pipe 72, it is preferable if both ends of the pipe 2022 are formed approximately round and connected with the respective portions. On account of such structure, transmission efficiency of optical signals does not deteriorate. In addition, deviation of cores at the connection portion of the pipe 2022 is tolerated to some extent.

Note that the mirror coating of the cone portion 2023 may be substituted with, e.g., stainless metal having high reflectivity for the X-axis-driving-force transmitting unit 6. The inner surface (optical-signal transmitting path) of the pipe 72 is also coated with materials having high reflectivity for the purpose of smooth transmission of light. In addition, to prevent light from being leaked, a round or a cylindrical hood (inner surface is similarly mirror-coated) is fixed on the substrate or the like without contacting the axis 201, so that the hood covers the E/O converter 71 and the photoreceptor 123.

The structure of the pipe 72 is now described in detail with respect to a conduction path of the electrical signals.

Figure 12B:
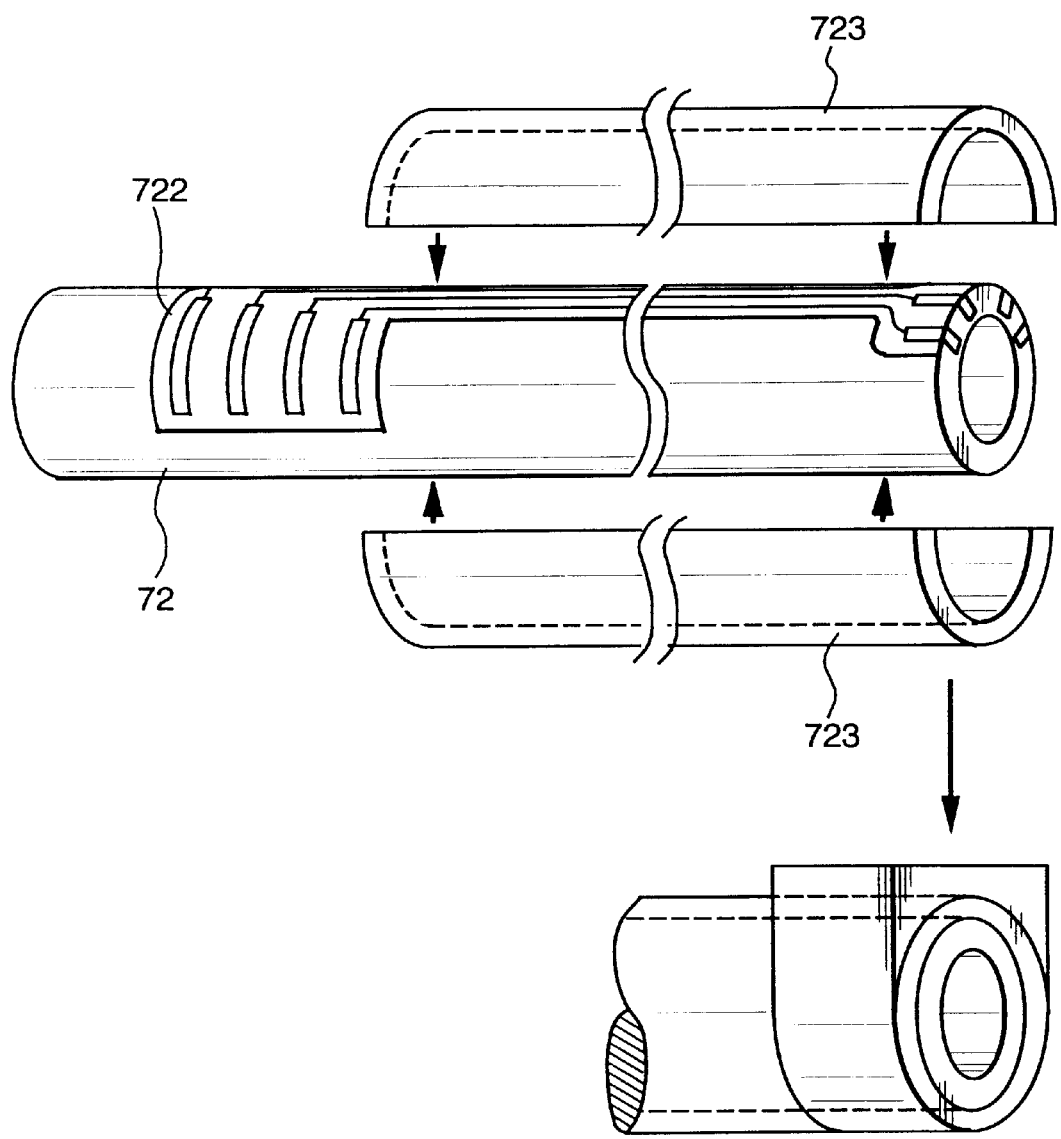

Referring to FIGS. 12A and 12B, an X-axis terminal 721 is arranged internally at one end (the side connected to the Y-shape supporting unit 8) of the pipe 72 (similar to 78 in FIG. 8). Flexible cables 722 accommodates the cables 13 which are described with reference to FIG. 2, and are made of a flexible substrate where a conductive material is arranged in-between insulation. The black portion in the drawing is a conductive portion (metal) where metal is exposed from one side of the substrate. The cables 722 are adhered to or fixed around the pipe 72 by pressuring with metallic parts or the like, and the inner portion 300a (FIG. 2) of each conductive bearing 300 is attached to and fixed on the respective conductive (metal) portion (FIG. 12A).

In this case, since the cables 722 are arranged in the periphery of the pipe 72, for instance, a pipe-like protective cover 723 may be provided as shown in FIG. 12B to protect the cables 722 from being damaged. Upon covering the cables with the protective cover 723, the spherical supporting unit 4 is attached via the bearing 400. The cables 722 may be incorporated in the pipe 72 at the time of forming the pipe 72. In that case, the pipe-like protective cover is unnecessary.

Figure 13A:
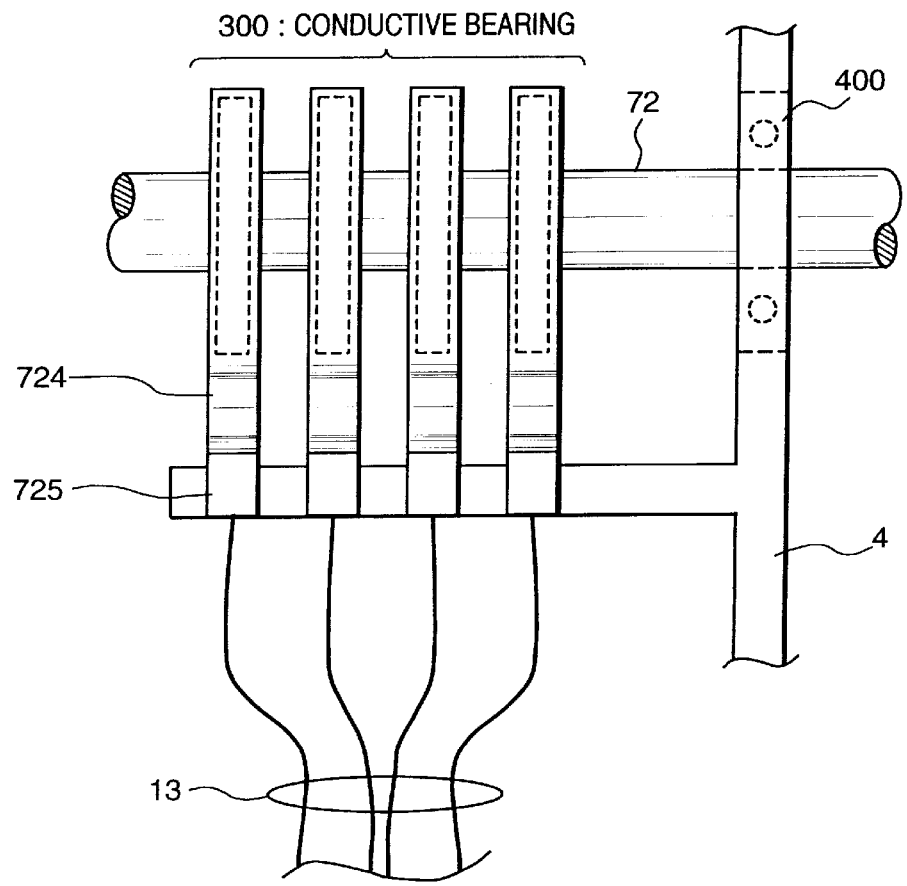
FIGS. 13A and 13B are a structural view showing the connection of a conductive portion of the X-axis bearing with an X-axis connecting terminal in the image sensing apparatus of the present embodiment.
Figure 13B:
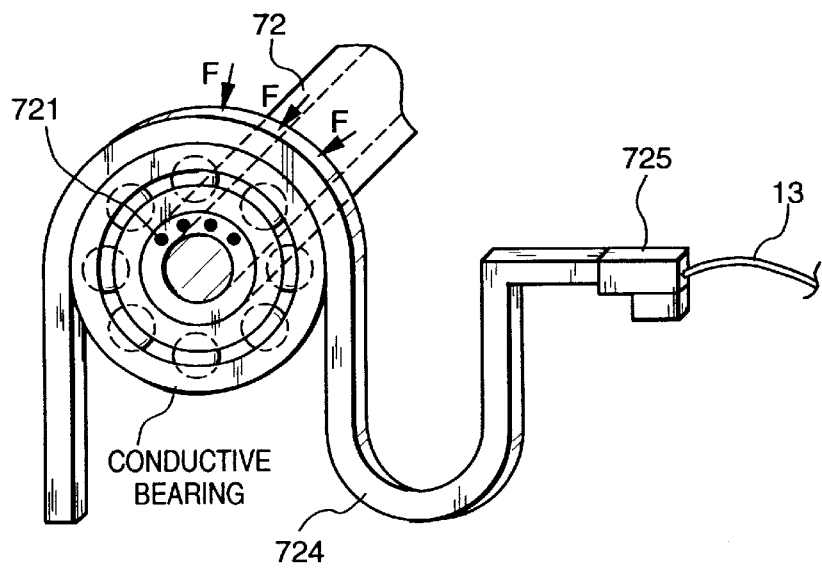

The other end of the cables 722 is adhered to and fixed on the X-axis terminal 721. The outer portion 300b (FIG. 2) of the conductive bearing 300 is connected with a conductive terminal 725 (FIGS. 13A and 13B), which is firmly supported by the spherical supporting unit 4, via a conductive spring 724 which will be described later (FIGS. 13A and 13B), whereby further connected to the cables 13. The outer portion 300b of the conductive bearing 300 and the conductive terminal 725 supported by the spherical supporting unit 4 are connected via the flexible conductive spring 724 (flat spring conductor) as shown in FIGS. 13A and 13B. The flexible conductive spring 724 is arranged perpendicular to the X axis to press the X axis (as indicated by the arrow F in FIG. 13B).

If a number of bearings 300 corresponding to the number of electrical signals are provided, plural bearings 300 must be stably connected without a play in the inner portion or outer portion of the plural bearings 300. In such case, if there is an error in the structure of the bearing or in its arrangement, the contact friction becomes large, thus the rotation friction cannot be reduced. On the other hand, if the structure of the bearing 300 is simple and the positioning of the bearing 300 is not precise, bearing contact becomes uneven, causing to generate spark noise in signals. Such problems may be solved by the aforementioned structure shown in FIG. 13A where the bearing is always pressed in one direction.

Note that with reference to FIG. 8, description has been provided on a structure where the spherical supporting unit 4 and the Y-shape supporting unit 8 are removable. In the case of attaching the spherical supporting unit 4 to the Y-shape supporting unit 8, a contact terminal is provided for the cables 14, at a position corresponding to the X-axis terminal 721 (=contact points 78 for electrical signals and power). In other words, when the spherical supporting unit 4 is attached to the Y-shape supporting unit 8, the metal contact portion arranged at each end portion of the pipe 72 and optical-signal transmission portion 73 contacts each other, and electrically conducts the cables 14 and cables 13. Herein, if the contact portions are arranged such that no other terminals contacts with the spherical supporting unit 4 at the time of attaching thereof, the spherical supporting unit 4 can be removed for changing a lens even when the power is on.

In the foregoing description, the connection between the spherical supporting unit 4 and the Y-shape supporting unit 8 has been described. The Y-shape supporting unit 8 and the pedestal supporting unit 12 can be similarly realized by applying the above-described description to the Y-axis cable connection portion 9 and the Y-shape supporting unit 8. Thus, the description and drawing thereof will not be provided.

The present invention is not limited to the above embodiments and various changes and modifications can be made within the spirit and scope of the present invention. Therefore, to appraise the public of the scope of the present invention, the following claims are made.

What is claimed is:

1. An image sensing apparatus comprising:

a lens unit;

converting unit converting an image, focused by said lens unit, into an electrical signal;

a spherical supporting unit supporting therein at least said lens unit and said converting unit;

a first supporting unit rotatably supporting said spherical supporting unit about a first axis through a substantial center of the spherical supporting unit, on which an image is focused by said lens unit;

a second supporting unit rotatably supporting said first supporting unit about a second axis being orthogonal to the first axis;

first driving unit, provided in the spherical supporting unit, that rotates said spherical supporting unit about the first axis;

second driving unit rotating said first supporting unit about the second axis;

first connecting unit rotatably connecting said spherical supporting unit with said first supporting unit to transmit a signal between said spherical supporting unit and said first supporting unit along the first axis; and second connecting unit rotatably connecting said first supporting unit with said second supporting unit to transmit a signal between said first supporting unit and said second supporting unit alone the second axis.

2. The image sensing apparatus according to claim 1, wherein said first connecting unit comprises:

a plurality of first conductive bearings having a rotation portion which rotates along with rotation of said spherical supporting unit, and a fixed portion which is fixed on a shaft which supports said spherical supporting unit at the first axis;

a first conductive member which electrically connects the fixed portion with signal wires from said first supporting unit; and a second conductive member which electrically connects the rotation portion with the converting unit in said spherical supporting unit.

3. The image sensing apparatus according to claim 1, wherein said second connecting unit comprises:
- a plurality of second conductive bearings having a rotation portion which rotates along with rotation of said first supporting unit, and a fixed portion which is fixed to the second axis;
- a third conductive member which electrically connects the fixed portion with signal wires from said first supporting unit; and
- a fourth conductive member which electrically connects the rotation portion with a circuit of said second supporting unit.

4. The image sensing apparatus according to claim 1, wherein a substantial center of the spherical supporting unit, at which an image is focused by said lens unit, is located on a line which orthogonally intersects both the first axis and the second axis.

5. The image sensing apparatus according to claim 1, wherein a motor serving as a driving source of said first driving unit is provided inside said spherical supporting unit.

6. The image sensing apparatus according to claim 2, wherein said first connecting unit comprises an axis member which is provided along the first axis, and which includes signal wires from said first supporting unit;
- wherein the fixed portion of said first conductive bearing is slideably connected with a periphery of the axis member, thereby being electrically connected with the signal wires.

7. The image sensing apparatus according to claim 6, further comprising pressing means for press-fitting said first conductive bearing toward the axis member.

8. An image sensing apparatus having a spherical supporting unit which is supported rotatably about a first axis through a substantial center of the spherical supporting unit, comprising:
- a lens unit provided in the spherical supporting unit;
- a photoreceptor provided at the substantial center of the spherical supporting unit, outputting an image signal in accordance with an image focused by the lens unit;
- first driving unit, provided in the spherical supporting unit, rotating said spherical supporting unit about the first axis;
- a first supporting unit, rotatable about a second axis which is orthogonal to the first axis, that supports said spherical supporting unit;
- second driving means for rotating said first supporting unit about the second axis;
- a first connecting unit, having a rotation portion which rotates along with rotation of said spherical supporting unit, and a fixed portion which is fixed along the first axis, for electrically connecting the fixed portion with the rotation portion;
- a second connecting unit, having a rotation portion which rotates along with rotation of said first supporting unit, and a fixed portion which is fixed along the second axis, for electrically connecting the fixed portion and the rotation portion,
- wherein an electrical contact is made between an inside of the spherical supporting unit and the fixed portion of the second connecting unit.

9. The image sensing apparatus according to claim 8, wherein said first and second connecting units include a conductive bearing.

10. The image sensing apparatus according to claim 9, further comprising detecting means for detecting a rotation angle between said spherical supporting unit and said first supporting unit.

* * * * *

UNITED STATES PATENT AND TRADEMARK OFFICE
CERTIFICATE OF CORRECTION

PATENT NO. : 6,147,701
DATED : November 12, 2000
INVENTOR(S) : Tamura et al.

It is certified that error appears in the above-identified patent and that said Letters Patent is hereby corrected as shown below:

Column 12,
Line 54, delete "alone" and insert -- along --

Signed and Sealed this

Fifteenth Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,147,701
DATED : November 14, 2000
INVENTOR(S) : Tamura et al.

It is certified that error appears in the above-identified patent and that said Letters Patent is hereby corrected as shown below:

Column 12,
Line 54, delete "alone" and insert -- along --.

This certificate supersedes Certificate of Correction issued February 15, 2005.

Signed and Sealed this

Sixth Day of September, 2005

JON W. DUDAS
*Director of the United States Patent and Trademark Office*